(12) United States Patent
Benjamin et al.

(10) Patent No.: US 11,960,868 B2
(45) Date of Patent: *Apr. 16, 2024

(54) BRANCH OBJECTS FOR DEPENDENT OPTIMIZATION PROBLEMS

(71) Applicant: AUTODESK, INC., San Francisco, CA (US)

(72) Inventors: David Benjamin, Brooklyn, NY (US); Dale Zhao, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/141,087

(22) Filed: Jan. 4, 2021

(65) Prior Publication Data
US 2021/0124566 A1 Apr. 29, 2021

Related U.S. Application Data

(63) Continuation of application No. 16/019,439, filed on Jun. 26, 2018, now Pat. No. 10,884,721.

(60) Provisional application No. 62/668,729, filed on May 8, 2018.

(51) Int. Cl.
*G06F 9/44* (2018.01)
*G06F 3/04817* (2022.01)
*G06F 8/41* (2018.01)
*G06F 30/00* (2020.01)

(52) U.S. Cl.
CPC .......... *G06F 8/443* (2013.01); *G06F 3/04817* (2013.01); *G06F 30/00* (2020.01)

(58) Field of Classification Search
None
See application file for complete search history.

(56) References Cited

U.S. PATENT DOCUMENTS

| | | | |
|---|---|---|---|
| 9,373,077 B1 | 6/2016 | Cohen et al. | |
| 10,379,868 B1 | 8/2019 | Proshin et al. | |
| 2003/0220772 A1* | 11/2003 | Chiang | G06F 17/11 703/2 |
| 2004/0034662 A1 | 2/2004 | Austin et al. | |
| 2004/0098678 A1 | 5/2004 | Teig et al. | |
| 2006/0111881 A1 | 5/2006 | Jackson | |
| 2006/0112383 A1 | 5/2006 | Chang et al. | |

(Continued)

*Primary Examiner* — Insun Kang
(74) *Attorney, Agent, or Firm* — Artegis Law Group, LLP

(57) ABSTRACT

A workflow engine processes a work problem to generate solutions for the work problem comprising a plurality of related optimization problems. The work problem may comprise a second optimization problem that is dependent on a first optimization problem, such that at least one solution for the first optimization problem is to be utilized as an initial solution for the second optimization problem. The workflow engine generates and stores a branch object for each optimization problem, each branch object specifying a solver engine assigned for processing the optimization problem and dependency information indicating a dependency relationship between the optimization problem and another optimization problem. The workflow engine processes the work problem based on the branch objects by initiating each solver engine to perform optimization operations on the assigned optimization problem based on the corresponding branch object to generate one or more solutions for the assigned optimization problem.

24 Claims, 6 Drawing Sheets

(56) References Cited

U.S. PATENT DOCUMENTS

| | | |
|---|---|---|
| 2006/0230389 A1 | 10/2006 | Moulckers et al. |
| 2007/0038657 A1 | 2/2007 | Denton et al. |
| 2007/0208677 A1 | 9/2007 | Goldberg et al. |
| 2008/0015828 A1 | 1/2008 | Washizawa et al. |
| 2008/0154838 A1 | 6/2008 | Watford et al. |
| 2009/0254504 A1 | 10/2009 | Hutson et al. |
| 2010/0031237 A1 | 2/2010 | Zlotnick |
| 2010/0106714 A1 | 4/2010 | Lim et al. |
| 2010/0180255 A1 | 7/2010 | Chung et al. |
| 2011/0088021 A1 | 4/2011 | Kruglick |
| 2012/0222011 A1 | 8/2012 | Farrell et al. |
| 2013/0125081 A1 | 5/2013 | Hershenson et al. |
| 2013/0290973 A1* | 10/2013 | Waas .................. G06F 9/54 718/103 |
| 2014/0033176 A1 | 1/2014 | Rama et al. |
| 2014/0149331 A1 | 5/2014 | Iorio |
| 2014/0344320 A1 | 11/2014 | Wallner et al. |
| 2015/0242757 A1 | 8/2015 | Kalagnanam et al. |
| 2016/0117154 A1 | 4/2016 | Przygienda et al. |
| 2016/0147712 A1* | 5/2016 | Chiang ................. G06F 17/11 708/446 |
| 2016/0291970 A1 | 10/2016 | Mallisetty et al. |
| 2016/0364220 A1 | 12/2016 | Arai |
| 2017/0213181 A1 | 7/2017 | Katz et al. |
| 2017/0255592 A1* | 9/2017 | Karimi .................. G06F 17/11 |
| 2017/0255872 A1* | 9/2017 | Hamze ................. G06F 17/10 |
| 2017/0277534 A1 | 9/2017 | Mallisetty et al. |
| 2017/0293840 A1 | 10/2017 | Ceugniet et al. |
| 2017/0364432 A1* | 12/2017 | Nishi ................. G06F 11/3608 |
| 2018/0080949 A1 | 3/2018 | Jost et al. |
| 2018/0239690 A1 | 8/2018 | Balestrazzi et al. |
| 2018/0308481 A1 | 10/2018 | Cohen et al. |
| 2019/0102152 A1 | 4/2019 | Lopez et al. |
| 2019/0235865 A1 | 8/2019 | Bilgory et al. |
| 2019/0286993 A1* | 9/2019 | Pan ......................... G06F 9/546 |
| 2019/0325320 A1 | 10/2019 | Shimokawa |

* cited by examiner

BRANCH OBJECTS FOR DEPENDENT OPTIMIZATION PROBLEMS

CROSS-REFERENCE TO RELATED APPLICATIONS

This application is a continuation of the co-pending U.S. patent application titled, "BRANCH OBJECTS FOR DEPENDENT OPTIMIZATION PROBLEMS," filed on Jun. 26, 2018 and having Ser. No. 16/019,439, which claims the benefit of U.S. provisional patent application titled "TECHNIQUES FOR MULTI-DISCIPLINARY DESIGN OPTIMIZATION," filed on May 8, 2018 and having Ser. No. 62/668,729. The subject matter of these related applications is hereby incorporated herein by reference.

BACKGROUND

Field of the Various Embodiments

Embodiments of the present invention generally relate to computer-aided design and, more specifically, to branch objects for dependent optimization problems.

Description of the Related Art

Designers oftentimes use computer-aided design (CAD) systems to assist in developing solutions to optimization problems encountered in the design process. Among other things, CAD systems provide complex solvers to generate solutions to optimization problems at the direction of the designer. In general, CAD systems are powerful tools that can significantly shorten product development cycles.

In existing CAD systems, a designer usually manually configures and assigns a particular solver to process a particular optimization problem. After configuration and assignment, the solver performs various optimization operations on the assigned optimization problem to generate one or more solutions to the optimization problem. While the solver is processing the optimization problems, situations may arise that require the solver to be paused and restarted at a later point in time. For example, the solver could be paused when there are insufficient computing resources to perform the optimization operations or when processing of the optimization problem is transferred to a different CAD system. Whenever a solver has to be restarted, the designer typically has to manually configure and assign the solver to the optimization problem again. Also, when processing of the optimization problem is transferred to another CAD system, the designer typically has to communicate with another designer operating the other CAD system to instruct the other designer with respect to configuring and assigning the solver to process the optimization problem.

Accordingly, a technical drawback of conventional approaches is that manually configuring and assigning a particular solver to process a particular optimization problem is burdensome, inefficient, and error prone. These problems are exacerbated when dealing with dependent optimization problems that have to be processed by multiple solvers. For such dependent optimization problems, the designer has to manually configure and assign each solver for each optimization problem and then manually configure the dependencies between the optimization problems and corresponding solvers. These manual configuration and assignment operations also have to be re-performed by the designer every time one of the solvers involved in a dependent optimization problem has to be paused.

As the foregoing illustrates, what is needed in the art are more effective design techniques for configuring and assigning solvers for processing optimization problems.

SUMMARY

Various embodiments described herein include a computer-implemented method. The method includes producing a first branch object specifying a first optimization problem and a first solver engine associated with the first optimization problem and producing a second branch object specifying a second optimization problem, a second solver engine associated with the second optimization problem, and a dependency between the second optimization problem and the first optimization problem. The method further includes processing the first optimization problem based on the first branch object to generate one or more solutions for the first optimization problem, and processing the second optimization problem based on the second branch object to generate one or more solutions for the second optimization problem.

At least one technological improvement of the disclosed techniques relative to prior art is that multiple branch objects can be produced that specify the configuration and assignment of multiple solver engines to multiple optimization problems as well as the dependencies between the different optimization problems. Optimization operations are then performed on the optimization problems based on the branch objects to generate one or more solutions to the optimization problems. Because the branch objects capture both the configuration and assignment of the different solver engines to the different optimization problems and the dependencies between the optimization problems, the branch objects can be implemented to enable optimization operations to be performed automatically on dependent optimization problems, without requiring manual intervention by the designer. In this manner, the burdens, inefficiencies, and errors typically incurred when manually configuring and assigning multiple solvers for dependent optimization problems are avoided.

At least one other technological improvement of the disclosed techniques relative to prior art is that the branch objects may be repeatedly retrieved and implemented whenever pause/resume processes are required to continue execution of the optimization operations on the dependent optimization problems. Thus, the disclosed techniques enable the optimization operations to be more easily and efficiently resumed after a pause operation relative to conventional approaches. In previous approaches, resuming after a pause operation required manual re-configuration and re-assignment of the multiple solvers to the dependent optimization problems and re-configuration of any dependencies upon resuming the optimization operations.

At least one other technological improvement of the disclosed techniques relative to prior art is that the branch objects may be retrieved and implemented at another computer system if the execution of the optimization operations on the dependent optimization problems is transferred to that other computer system. Thus, the disclosed techniques enable the optimization operations to be more easily and efficiently resumed at another computer system relative to conventional approaches. In previous approaches, resuming at another computer system required communications with a second designer at the other computer system followed by manual re-configuration and re-assignment of the multiple solvers to the dependent optimization problems and re-configuration of any dependencies by the second designer upon resuming the optimization operations at the other computer system.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As used herein, an "object" (such as a solver state object or branch object) may comprise any type of data structure or data container for storing data. As used herein, a "reference" (such as a reference to a solution or solver state stack) may comprise a pointer or identifier to an element (data or programming element) used to locate the element.

Computer System Environment

Figure 1:
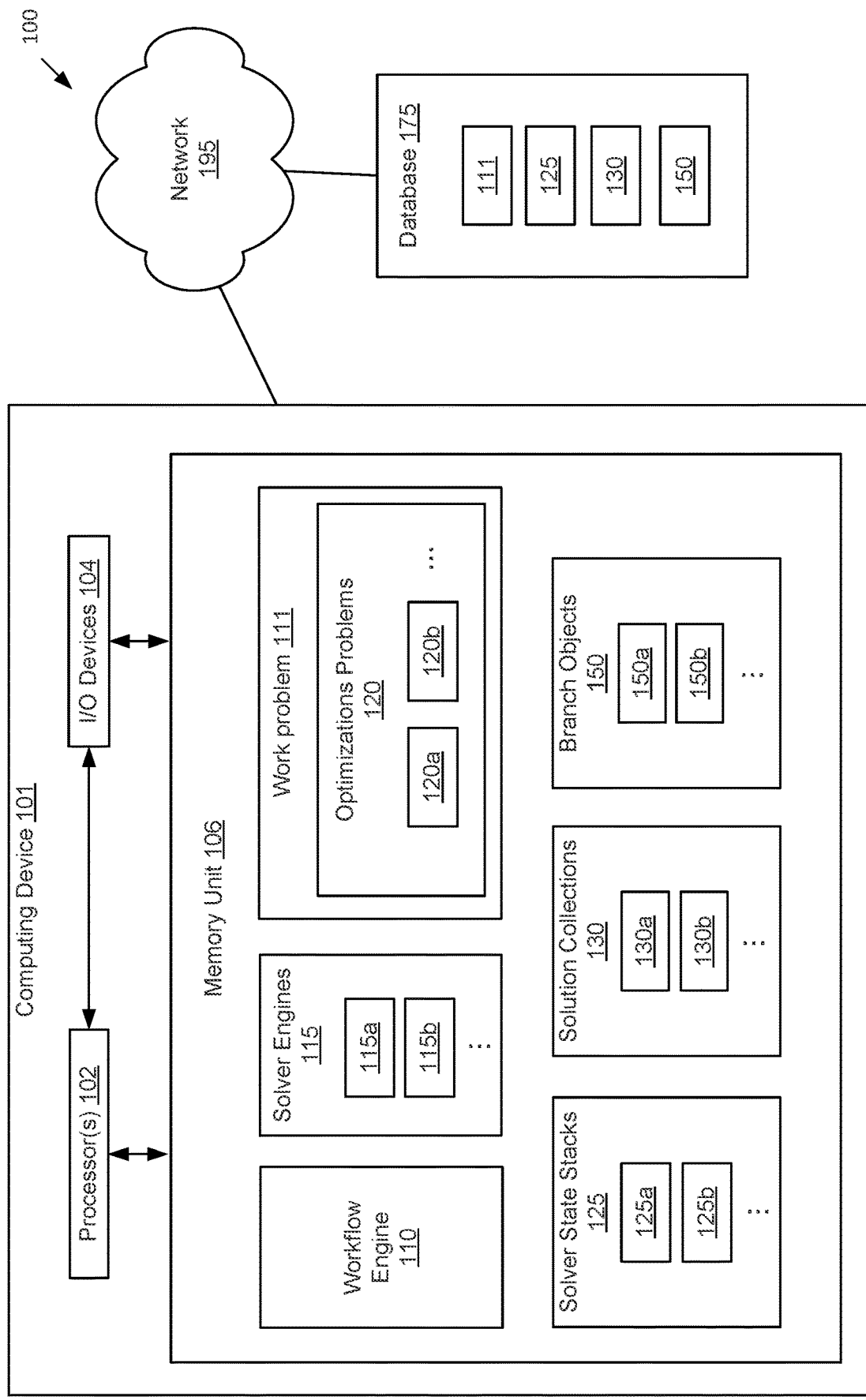
FIG. 1 illustrates a computer environment configured to implement one or more aspects of the present invention.

FIG. 1 illustrates a computer environment 100 configured to implement one or more aspects of the present invention. The computer environment 100 may comprise an environment for generating solutions for a work problem. As shown, the environment 100 includes a computing device 101 and a database 175 connected via a network 195. The network 195 may include a wide area network (WAN), a local area network (LAN), a wireless (WiFi) network, and/or the Internet, among others.

Computing device 101 may be a server system, client system, workstation, a laptop computer, a tablet or handheld device, or any other type of computing device. Computing device 101 includes one or more processing units 102 coupled to input/output (I/O) devices 104 and to memory unit 106. Processing unit(s) 102 may be a central processing unit (CPU), a graphics processing unit (GPU), or a combination of different processing units, such as a CPU configured to operate in conjunction with a GPU. In general, processing unit 102 may be any technically feasible hardware unit capable of processing data and/or executing software applications. I/O devices 104 are also coupled to memory unit 106 and incudes input devices capable of receiving user input, output devices capable of generating output, as well as network devices capable of communicating via a network 195. Examples of input devices include a keyboard, a mouse, a touchscreen, a microphone, or other input elements. Examples of output devices include a monitor display, audio speakers/headphones, a printer, or other output elements. I/O devices 104 may be configured to receive various types of input from an end-user of the environment 100, and to also provide various types of output to the end-user of the environment 100, such as a user interface for displaying output to a user and receiving input from the user.

The memory unit 106 may include a hard disk, a random access memory (RAM) module, a flash memory unit, or any other type of memory unit or combination thereof. Processor 102 and I/O devices 104 are configured to read data from and write data to memory 106. The memory unit 106 is configured to store software application(s) and data. Instructions from the software constructs within the memory unit 106 are executed by processors 102 to enable the inventive operations and functions described herein. In various embodiments, the memory unit 106 is configured to store a workflow engine 110, a plurality of solver engines 115 (such as first solver engine 115a, second solver engine 115b, etc.), a work problem 111 comprising a plurality of optimization problems 120 (such as first optimization problem 120a, second optimization problem 120b, etc.), a plurality of solver state stacks 125 (such as first solver state stack 125a for first solver engine 115a, second solver state stack 125b for first solver engine 115a, etc.), a plurality of solution collections 130 (such as first solution collection 130a for first solver engine 115a, second solution collection 130b for first solver engine 115a, etc.), and a plurality of branch objects 150 (such as first branch object 150a, second branch object 150b, etc.) to provide an underlying functionality of techniques described in various embodiments herein.

In some embodiments, a solver engine 115 comprises an optimizer engine that generates one or more solutions for an optimization problem 120. The solver engine 115 may comprise an iterative optimizer that begins/starts at an initial solution and initial solver state. The initial solution may comprise an initial set of inputs and an initial set of outputs that are used as a starting point for the processing of the optimization problem 120. The solver engine 115 may then iteratively step the solver state at each iteration to generate one or more intermediate solutions to the optimization problem 120 for converging on a final optimized solution produced when the termination condition is incurred. In some embodiments, the solver engine 115 may comprise any type of optimizer engine. For example, the solver engine 115 may comprise a topology optimization engine for processing mechanical structure problems, a global search engine that works on black box problems whose evaluation logic is unknown, a local search engine that works on problems whose gradient information is available and can be utilized, and so forth. In other embodiments, the solver engine 115 comprises any other type of optimizer engine than listed here.

In general, a work problem 111 represents an overall engineering problem to be processed by a workflow engine 110 that generates one or more solutions for the work problem 111. The work problem 111 includes and is defined via a plurality of dependent optimization problems 120. For example, second optimization problem 120b may be dependent on a first optimization problem 120a, such that at least one solution generated for the first optimization problem 120a is utilized as an initial solution for the second optimization problem 120b. In other words, at least one solution generated for the first optimization problem 120a by the first solver engine 115a is utilized as a starting point for second solver engine 115b for processing second optimization problem 120b. The workflow engine 110 may configure and assign a particular solver engine 115 in the plurality of solver engines 115 to process a particular optimization problem 120 in the work problem 111. For example, the workflow engine 110 may configure and assign first solver engine 115a to process a first optimization problem 120a and configure and assign second solver engine 115b to process second optimization problem 120b. As used herein, when a pair of optimization problems 120 are dependent upon each other, the pair of solver engines 115 assigned to process the pair of optimization problems 120 are also considered dependent upon each other. For example, since second optimization problem 120b is dependent on a first optimization problem 120a, second solver engine 115b is also dependent on a first solver engine 115a, such that at least one solver state of first solver engine 115a during processing of first optimization problem 120a is utilized as an initial solver state for second solver engine 115b for processing second optimization problem 120b.

Figure 2:
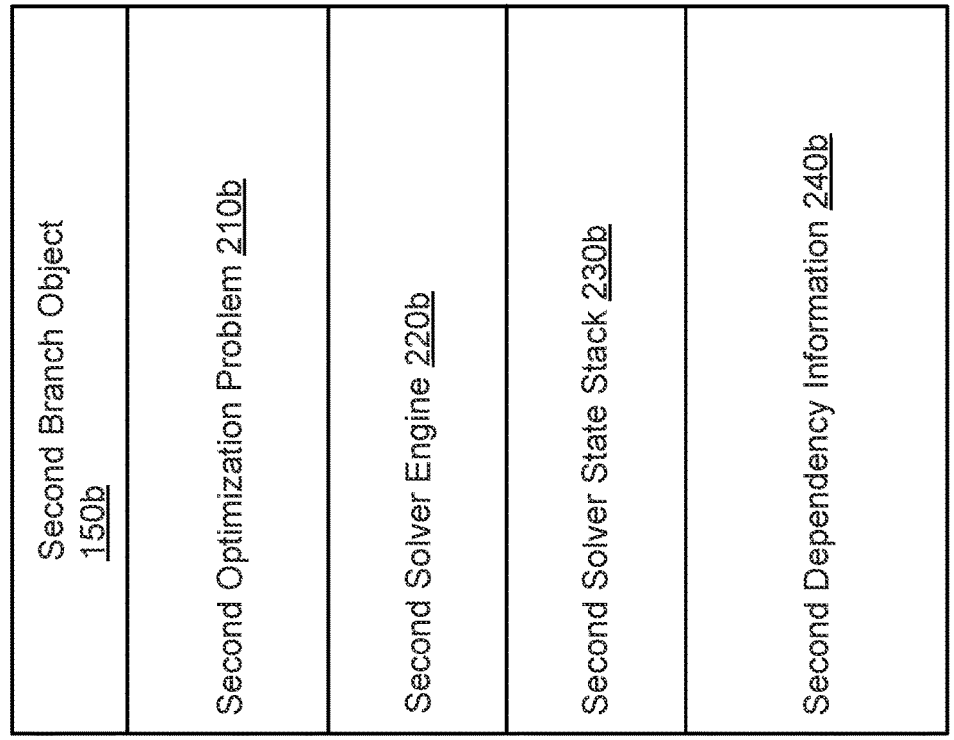
FIG. 2 is a more detailed illustration of the branch objects of FIG. 1, according to various embodiments of the present invention.

In some embodiments, the workflow engine 110 generates and stores a plurality of branch objects 150 for each work problem 111. Each branch object 150 may specify a pair comprising an optimization problem 120 and a solver engine 115. FIG. 2 is a more detailed illustration of the branch objects of FIG. 1, according to various embodiments of the present invention. As shown, each branch object 150 may specify a particular optimization problem 120 in a problem data field 210 and a particular solver engine 115 assigned for processing the particular optimization problem 120 in a solver data field 220. Each branch object 150 may also specify a corresponding solver state stack 125 associated with the solver engine 115 and branch object 150 in a solver stack data field 230. In some embodiments, each data field specifies an element by including a reference to the element.

For example, the workflow engine 110 may generate and store a first branch object 150a for a first optimization problem and a second branch object 150b for a second optimization problem. The first branch object 150a may include a reference to the first optimization problem in the problem data field 210a, a reference to a first solver engine in the solver data field 220a, and a reference to a first solver state stack in the solver stack data field 230a. For example, the second branch object 150b may include a reference to the second optimization problem in the problem data field 210b, a reference to a second solver engine in the solver data field 220b, and a reference to a second solver state stack in the solver stack data field 230b.

Each branch object 150 may further specify dependency information in a dependency data field 240. In these embodiments, each branch object 150 specifies dependency information indicating a dependency relationship between the particular optimization problem 120 and another optimization problem 120 in the work problem 111. The branch object 150 may specify this dependency relationship by indicating the dependency between the dependent optimization problems 120, indicating the dependency between the corresponding dependent solver engines 115, and/or indicating the dependency between the current branch object 150 and another branch object 150 generated for the dependent optimization problem 120 and solver engine 115. In some embodiments, the dependency information may include references to particular elements.

For example, first dependency information in the dependency data field 240a of the first branch object 150a may specify a dependency relationship between the first optimization problem and the second optimization problem by indicating that second optimization problem is dependent on a first optimization problem, indicating that second solver engine is dependent on a first solver engine, and/or indicating that second branch object 150b is dependent on a first branch object 150a. The dependency data field 240a of the first branch object 150a may further include a reference to the second optimization problem, a reference to the second solver engine, and/or a reference to the second branch object 150b. For example, second dependency information in the dependency data field 240b of the second branch object 150b may likewise specify a dependency relationship between the second optimization problem and the first optimization problem by indicating that second optimization problem is dependent on a first optimization problem, indicating that second solver engine is dependent on a first solver engine, and/or indicating that second branch object 150b is dependent on a first branch object 150a. The dependency data field 240b of the second branch object 150b may further include a reference to the first optimization problem, a reference to the first solver engine, and/or a reference to the first branch object 150a.

The workflow engine 110 may then utilize the plurality of branch objects 150 generated for the work problem 111 to produce one or more solutions for the work problem 111. To do so, the workflow engine 110 may coordinate operations of a plurality of solver engines 115 for processing the plurality of optimization problems 120 of the work problem 111 based on the plurality of branch objects 150. In particular, the workflow engine 110 may execute optimization operations for each optimization problem 120 of the work problem 111 based on the plurality of branch objects 150. For example, based on a first branch object 150a, the workflow engine 110 may initiate first solver engine 115a to process a first optimization problem 120a to generate one or more solutions for the first optimization problem 120a. Based on a second branch object 150b, the workflow engine 110 may also initiate second solver engine 115b to process second optimization problem 120b to generate one or more solutions for the second optimization problem 120b using one or more solutions generated for the first optimization problem 120a by the first solver engine 115a.

In particular, based on the dependency information specified in first branch object 150a and/or second branch object 150b, the workflow engine 110 may determine that second optimization problem 120b is dependent on a first optimization problem 120a, second solver engine 115b is dependent on a first solver engine 115a, and/or second branch object 150b is dependent on a first branch object 150a. Based on the dependency information, the workflow engine 110 may initiate second solver engine 115b to receive intermediate or final solution(s) generated for the first optimization problem 120a by the first solver engine 115a as initial solution(s) for the second optimization problem 120b. The workflow engine 110 then initiates second solver engine 115b to utilize the initial solution(s) for processing second optimization problem 120b to generate one or more subsequent solutions for the second optimization problem 120b.

Thus, the one or more subsequent solutions generated for the second optimization problem 120b by second solver engine 115b comprises the intermediate or final solutions for the overall work problem 111.

A solver engine 115 processes an optimization problem 120 to generate one or more solutions for the optimization problem 120 that are stored to a solution collection 130 associated with the solver engine 115. In these embodiments, each solver engine 115 is associated with a solution collection 130 that stores intermediate or final solutions generated for the optimization problem 120. For example, solutions generated by the first solver engine 115a for the first optimization problem 120a may be stored to first solution collection 130a and solutions generated by second solver engine 115b for the second optimization problem 120b may be stored to second solution collection 130b.

During the processing of an optimization problem 120 by a solver engine 115, the workflow engine 110 may initiate the solver engine 115 to generate and store a solver state object comprising state information of the solver engine 115 and one or more references to one or more solutions stored in a corresponding solution collection 130 for the solver engine 115. The workflow engine 110 may initiate the solver engine 115 to generate and store a solver state object when a triggering condition is incurred. For example, the workflow engine 110 may initiate the solver engine 115 to generate and store a solver state object at predetermined time intervals or a predetermined number of iterations (such as every 10 iterations) of the solver engine 115. Also, the workflow engine 110 may initiate the solver engine 115 to generate and store a solver state object when a pause command is received to pause processing of the optimization problem 120 by the solver engine 115, for example, when computing resources are determined to be insufficient or when transferring the processing of the optimization problem 120 to another computing device. Further, the workflow engine 110 may initiate the solver engine 115 to generate and store a solver state object when processing of the optimization problem 120 by the solver engine 115 is completed, for example, when determining that a terminating condition is incurred.

The state information in the solver state object may represent an internal state of the solver engine 115 at the point in time the solver state object is generated. The state information stored in a solver state object for a solver engine 115 depends on the type of solver engine 115. For example, for a genetic algorithm (GA) solver implementing a stochastic algorithm relying on a random source, the state information may include a random number generator state, a number of generations that have been calculated, and/or the population (solution set) of the current generation. For example, for a gradient-based deterministic solver, the state information may include a number of iterations already calculated, a state of the current solution or past solutions (the state of the set of current input and output values). For example, for a topology optimization solver, the state information may include a current shape of a model after the current number of iterations at the time of the solver state is generated.

The one or more references to one or more solutions in the solver state object may comprise references to current solutions generated by the solver engine 115 for the optimization problem 120 at the point in time the solver state object is generated. For a solver state object generated while the solver engine 115 is still continuing to process the optimization problem 120, these solutions comprise intermediate solutions to the optimization problem 120. For a solver state object generated when the solver engine 115 has completed processing of the optimization problem 120, these solutions comprise final solutions to the optimization problem 120. In these embodiments, each solver engine 115 is associated with a solver state stack 125. Each solver state object generated for a solver engine 115 is then stored to the corresponding solver state stack 125. For example, solver state objects generated for first solver engine 115a may be stored to first solver state stack 125a and solver state objects generated for first solver engine 115a may be stored to second solver state stack 125b.

Figure 3:
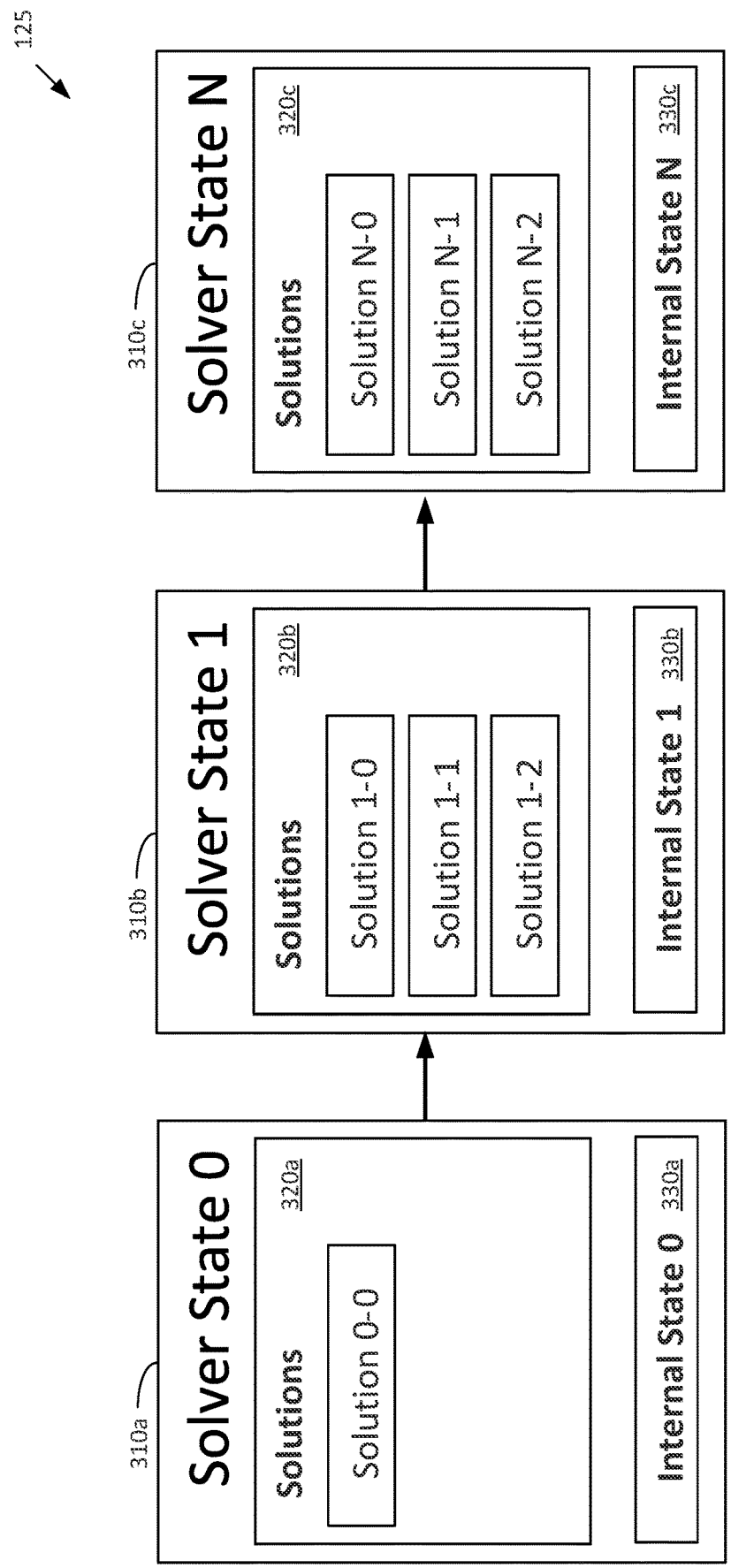
FIG. 3 is a more detailed illustration of the solver state stack of FIG. 1, according to various embodiments of the present invention.

FIG. 3 is a more detailed illustration of the solver state stack of FIG. 1, according to various embodiments of the present invention. The solver state stack 125 stores solver state objects generated for a corresponding solver engine 115 and organizes the solver state objects, for example, from most recent solver state object to oldest solver state object. As shown, the solver state stack 125 includes a plurality of solver state objects 310, such as an initial solver state 310a ("Solver State 0"), an intermediate solver state 310b ("Solver State 1"), and a final solver state 310c ("Solver State N"). In the example of FIG. 3, only one intermediate solver state is shown, although sometimes the solver state stack 125 comprises a large number of intermediate solver states. Each solver state object 310 contains references 320 to zero or more solutions associated with the solver state object 310. The solutions may be stored in a solution collection 130 corresponding to the solver engine 115. Each solver state object 310 also contains state information 330 describing an internal state of the solver engine 115 at the point in time the particular solver state object 310 is generated.

For example, the initial solver state 310a may include a reference 320a to an initial solution that is provided by another solver engine 115 generated for a related optimization problem 120. In other embodiments, the initial solver state 310a may include no references 320a to any solutions. The initial solver state 310a may also include state information 330a describing an initial internal state of the solver engine 115. For example, the intermediate solver state 310b may include references 320b to several intermediate solutions generated by the solver engine 115 and state information 330b describing an intermediate internal state of the solver engine 115. For example, the final solver state 310c may include references 320c to final solutions generated by the solver engine 115 and state information 330c describing a final internal state of the solver engine 115 at the time a termination condition is incurred.

Referring back to FIG. 1, the computing device 101 may be connected to a database 175 via the network 195. In some embodiments, the database 175 may store a plurality of items including the work problem 111 comprising the plurality of optimization problems 120, the plurality of solver state stacks 125, the plurality of solution collections 130, and the plurality of branch objects 150. The computing device 101 may store and retrieve the plurality of items from the database 175 during various techniques performed by the computing device 101 as disclosed herein. In other embodiments, the computing device 101 is locally connected to the database 175 without requiring connection via the network 195.

Work Problem Example

As an example, the work problem 111 comprises an overall design problem for designing a table with four legs that can be optimized in two connected steps using two different solver engines 115. The work problem 111 may comprise a second optimization problem that is dependent on a first optimization problem. The first optimization problem comprises a discrete optimization that selects optimal table leg designs from a large library of table leg designs. The workflow engine 115 may generate a first branch object 150 that specifies a first solver engine 115 comprising a discrete optimizer for processing the first optimization problem. The second optimization problem comprises a continuous optimization that iteratively refines sizing and positioning of each table leg. The workflow engine 115 may generate a second branch object 150 that specifies a second solver engine 115 comprising a continuous optimizer for processing the second optimization problem. The first branch object 150 and/or the second branch object 150 may further specify that the second optimization problem is dependent on the first optimization problem, the second solver engine 115 is dependent on the first solver engine 115, and/or the second branch object 150 is dependent on the first branch object 150. The work problem 111 may then process the work problem 111 based on the first and second branch objects 150, whereby at least one solution for the first optimization problem is utilized as an initial solution for the second optimization problem. In this regard, the first solver engine 115 may generate a first solution comprising an optimal selection of a particular table leg design from the library, the first solution then being received by the second solver engine 115 as an initial solution. The second solver engine 115 then performs continuous optimization on the initial solution that iteratively refines sizing and positioning of each table leg in the initial solution.

Each optimization problem 120 may comprise a general description of a particular optimization problem to be optimized/solved by a particular solver engine 115. In particular, each optimization problem 120 may comprise a high-level engineering problem generally defined as a set of inputs (variable or constant inputs), a set of one or more outputs (including at least one objective output), and optionally a set of one or more constraints. An objective may comprise an output of the optimization problem 120 that is to be maximized or minimized by a solver engine 120. In particular, an objective may specify a property in a solution to be maximized or minimized, such as maximizing stiffness, minimizing displacement, or minimizing mass or volume. An objective may specify optimizations for the solution and include measurable criteria for evaluating the effectiveness of the solution (how well the solution solves the optimization problem). For example, an objective may specify a minimum weight and a minimum volume for a designed product, while still satisfying the set of constraints. A constraint may specify a value of a property of the solution that the solution must satisfy, such as a maximum stress below a yield stress or a maximum volume. Thus, a constraint sets a quantifiable value of a property that the solution must meet. For example, a constraint may specify that the "maximum beam diameter is 3 cm," or "maximum beam height is 1 meter." In other cases, the constraints may define forces that the solution must tolerate in a real-world environment.

For each optimization problem 120, the workflow engine 110 may generate an objective function comprising a mathematical function representation of the corresponding optimization problem 120. The objective function may be implemented through programming code that performs the mathematical function of the objective function. The solver engine 115 assigned to process an optimization problem 120 may invoke the objective function generated for the optimization problem 120 to generate one or more solutions for the optimization problem 120. In this regard, the objective function may be considered a function that receives inputs and generates outputs based on the inputs, the outputs including at least one objective that is to be maximized or minimized by the assigned solver engine 115. The workflow engine 115 may then generate a branch object 150 that specifies a solver engine 115 for processing the optimization problem and corresponding objective function.

In the table design example discussed above, the second optimization problem comprises a continuous optimization that iteratively refines sizing and positioning of each table leg. The workflow engine 115 may generate a second branch object that specifies a second solver engine comprising a continuous optimizer for processing the second optimization problem. The second optimization problem may specify a given tabletop and four legs for the table, where the radius, angle and location of each leg can be varied. The second optimization problem may further specify that the table should be able to sustain a certain predetermined load on the tabletop while exhibiting a minimum deformation measured as displacement and that the table should be as light in weight as possible. The second optimization problem may further specify that the table must fit into a given rectangular footprint. In this example, the inputs for the second optimization problem include variable inputs comprising the radius, angle and location of each table leg and constant inputs comprising the dimensions and weight of the given tabletop and the predetermined load on the tabletop. The outputs for the second optimization problem include two objective outputs to be minimized comprising weight and displacement. A constraint for the second optimization problem includes the rectangular footprint requirement of the table.

An objective function may then be generated for the second optimization problem, the objective function comprising a mathematical function representation of the second optimization problem. The objective function receives as inputs the radius, angle and location of each table leg, the dimensions and weight of the given tabletop, and the predetermined load on the tabletop. The objective function then generates outputs based on the inputs, the outputs including the two objective outputs to be minimized comprising weight and displacement. The objective outputs are minimized by the second solver engine assigned to process the second optimization problem via iterative optimizing operations. At each iteration, the second solver engine may generate one or more solutions that each satisfy the constraint for the second optimization problem (the rectangular footprint requirement of the table).

Each generated solution may be expressed as a set of input values (including variables and constants) and a set of corresponding output values (including objective output values and non-objective output values). For example, a solution may comprise, for each leg, input values including the predetermined dimensions and weight of the given tabletop, the predetermined load on the tabletop, a radius of 2 cm, an angle of 90 degrees between the leg and an X-axis, an angle of 120 degrees between the leg and a Y-axis, and a support location that is 10 cm from each corresponding edge of the tabletop. In this example, the solution may comprise output values determined by the objective function based on the given input values, the outputs including a weight of 9 kg and a displacement of 4 mm. At a next iteration, the second solver engine may adjust the variable input values to generate resulting output values as determined by the objective function. The second solver engine then generates one or more solutions that satisfy the footprint requirement for the table. The second solver engine iteratively evaluates the set of outputs based on the at least one objective of the second optimization problem and iteratively adjusts the input values to better minimize the objective output values. The second solver engine may continue the iterative processing of the second optimization problem until a termination condition is triggered (such as a maximum number of iterations or a maximum amount of time allotted for processing the second optimization problem is reached or a convergence within a given threshold to optimal solutions is achieved).

As discussed above, the workflow engine 110 coordinates and initiates the plurality of the solver engines 115 to process the plurality of dependent optimization problems 120 of the work problem 111 based on the plurality of branch objects 150. In the table design example, the workflow engine 110 coordinates and initiates the first and second solver engines to process the first and second optimization problems based on the first and second branch objects 150. In some embodiments, during processing of the optimization problems 120, the workflow engine 110 may generate and display a graphical representation of a current state of the processing of the optimization problems 120 by the solver engines 115 in a user interface.

Graphical Representation of Dependent Optimization Problems

Figure 4:
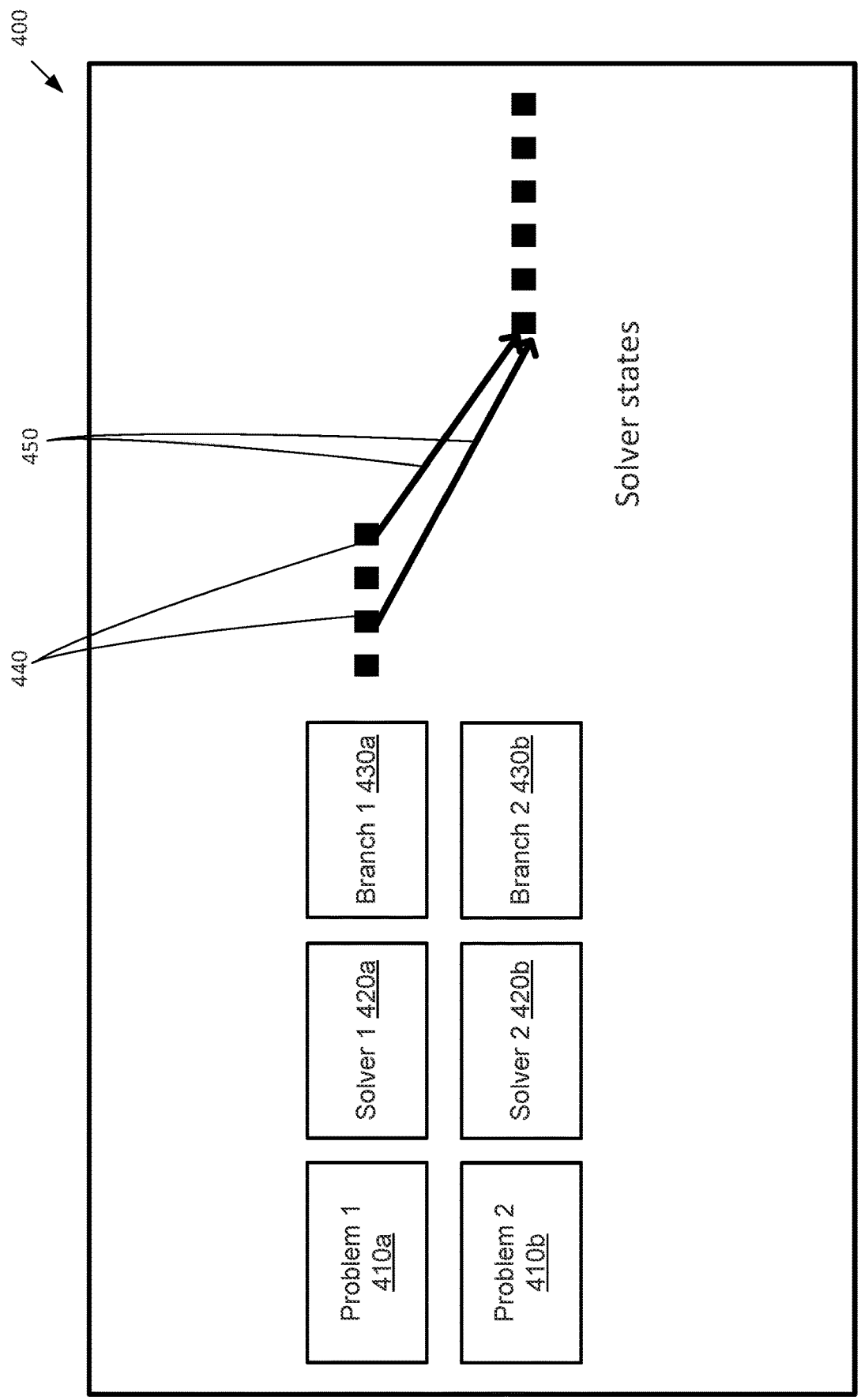
FIG. 4 is a graphical representation of two dependent optimization problems being processed, according to various embodiments of the present invention.

FIG. 4 is a graphical representation of two dependent optimization problems being processed, according to various embodiments of the present invention. For the table design example, the user interface 400 may display selectable icons representing the first optimization problem 410*a*, the second optimization problem 410*b*, the first solver engine 420*a*, the second solver engine 420*b*, the first branch object 430*a*, and the second branch object 430*b*. When a user selects an icon for an optimization problem (such as 410*a* or 410*b*), the workflow engine 110 may retrieve and display information for the selected optimization problem in the user interface 400. When a user selects an icon for a solver engine (such as 420*a* or 420*b*), the workflow engine 110 may retrieve and display information for the selected solver engine in the user interface 400, such as the type of solver engine and its parameters. When a user selects an icon for a branch object (such as 430*a* or 430*b*), the workflow engine 110 may retrieve and display information for the selected branch object in the user interface 400, such as the branch object information shown in FIG. 2.

As shown, the user interface 400 may also display selectable icons representing various solver state objects 440 that are generated and stored for the first and second solver engines. When a user selects an icon for a solver state object 440, the workflow engine 110 may retrieve and display information for the selected solver state object in the user interface 400, such as the solver state object information shown in FIG. 3. As the solver state objects contain the information for each step of the solving/optimization process for a solver engine 115, the displaying of such information may be valuable to the user. For example, from the information in the solver state objects, the user can gain better insights on how the optimization is performed, discover any bottlenecks or possible improvements in solver engine setup and optimization problem formulation, analyze and visualize the optimization process, and/or more easily determine the cause of potential errors.

In addition, through the user interface 400, the user may select one or more solver states of the first solver engine to be used as an initial solver state for the second solver engine for processing the second optimization problem. For example, the selections by the user may be graphically represented in the user interface 400 by arrows 450 between the selected one or more solver states of the first solver engine and the initial solver state for the second solver engine. As shown, the selected solver states of the first solver engine may comprise intermediate or final solutions for the first optimization problem. In response, the workflow engine 110 may initiate the second solver engine to process the second optimization problem using the selected solver states to initialize the initial solver state of the second solver engine. In particular, the workflow engine 110 may initiate the second solver engine to process the second optimization problem using at least one solution of the selected solver states as an initial solution. In other embodiments, as a default, the workflow engine 110 may initiate the second solver engine to process the second optimization problem using at least one final solution of the first optimization problem as an initial solution without requiring inputs from the user. The workflow engine 110 also updates the user interface 400 to visually display additional solver state objects that are generated during the processing of the first and second optimization problems by the first and second solver engines.

For illustrative purposes, in the examples described herein, the work problem 111 comprises a second optimization problem that is dependent on a first optimization problem. In other embodiments, however, the work problem 111 comprises any number of optimization problems, whereby at least one pair of optimization problems have a dependency relationship. For example, the work problem 111 may further comprise a third optimization problem that is dependent on the second optimization problem, which in turn is dependent on the first optimization problem, and so forth. In other words, at least one solution for the first optimization problem is used as an initial solution for the second optimization problem, and at least one solution of the second optimization problem is used as an initial solution for the third optimization problem, and at least one solution of the third optimization problem comprises at least one solution of the work problem 111. As another example, the work problem 111 may comprise a first optimization problem that is independent from a second optimization problem, wherein a third optimization problem is dependent on both the first optimization problem and the second optimization problem. In other words, at least one solution for the first optimization problem is used as an initial solution for the third optimization problem, and at least one solution of the second optimization problem is also used as an initial solution for the third optimization problem, and at least one solution of the third optimization problem comprises at least one solution of the work problem 111.

For illustrative purposes, in the examples described herein, the work problem 111 comprises a second optimization problem that is dependent on a first optimization problem, wherein the first optimization problem is processed by a first solver engine and the second optimization problem is processed by a second solver engine. In some embodiments, the first and second solver engines comprise different types of solver engines. In other embodiments, the first and second solver engines comprise the same type of solver engine.

Method Flowcharts for Processing Dependent Optimization Problems

Figure 5:
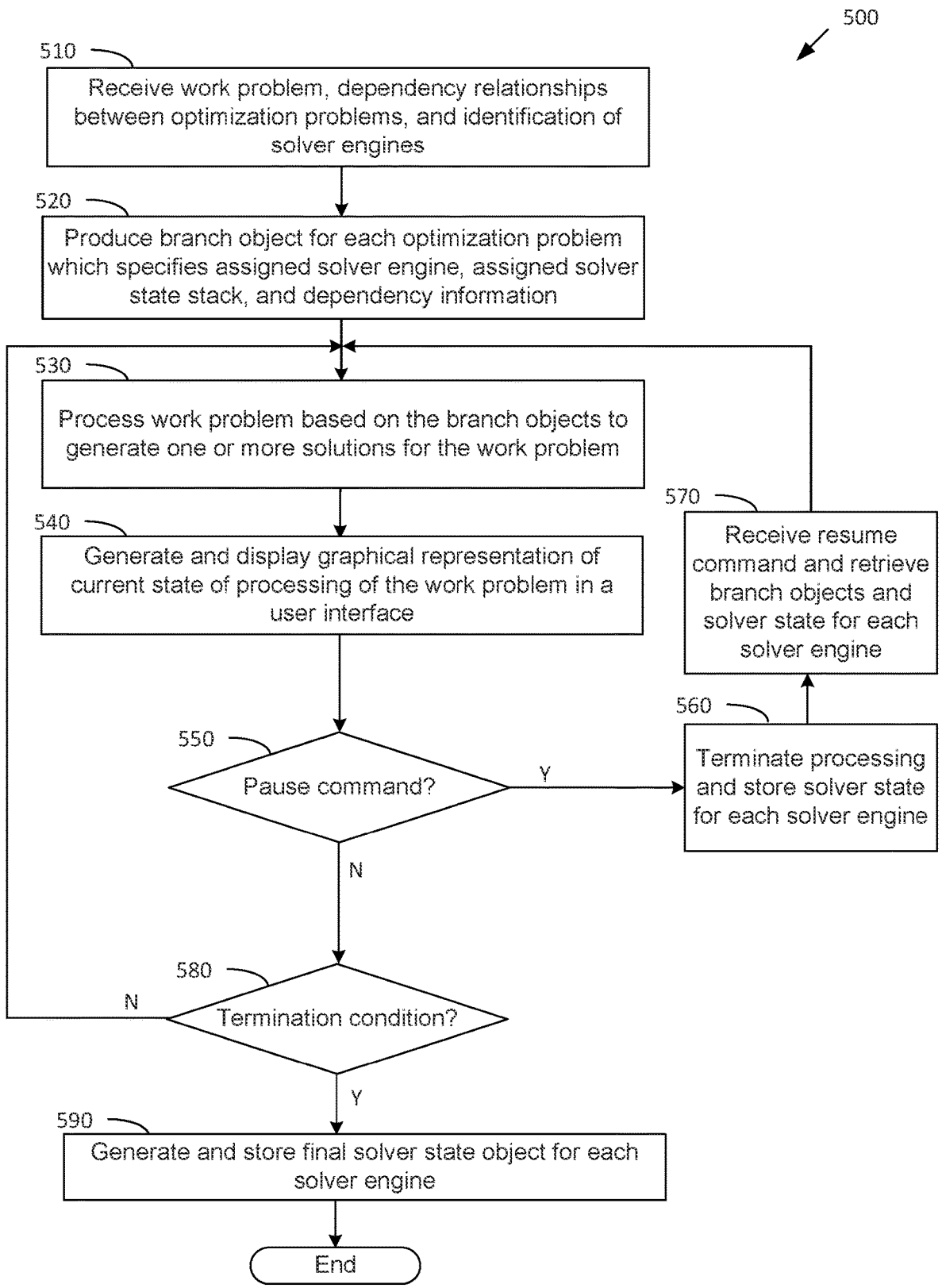
FIG. 5 illustrates a flow diagram of method steps for generating solutions to dependent optimization problems using branch objects, according to various embodiments of the present invention.

FIG. 5 illustrates a flow diagram of method steps for generating solutions to dependent optimization problems using branch objects, according to various embodiments of the present invention. Although the method steps are described in conjunction with the systems of FIGS. 1-4, persons skilled in the art will understand that the method steps can be performed in any order by any system. In some embodiments, the method 500 may be performed by a workflow engine 110 in conjunction with a plurality of solver engines 115.

The method 500 begins when the workflow engine 110 receives from a user (at step 510) a work problem 111 comprising a plurality of related optimization problems 120, identification of any dependency relationships between the optimization problems 120, and identification of a solver engine 115 for processing each optimization problem 120 in the work problem 111. For example, the workflow engine 110 receives from a user a work problem 111 comprising first and second optimization problems 120, wherein the second optimization problem is specified as being dependent on the first optimization problem. The workflow engine 110 may further receive from a user identification of a first solver engine for processing the first optimization problem and identification of a second solver engine for processing the second optimization problem.

For each optimization problem 120 in the work problem 111, the workflow engine 110 produces (at step 520) a branch object 150 associated with the optimization problem 120 which specifies the optimization problem 120, the assigned solver engine 115, the assigned solver state stack 125, and dependency information for the optimization problem 120. The optimization problems 120, solver state stacks 125, and branch objects 150 may be stored locally and/or on a database 175 via a network. For example, the workflow engine 110 may produce a first branch object for the first optimization problem which stores a reference to the first optimization problem, a reference to the first solver engine, a reference to the first solver state stack, and dependency information that indicates the second optimization problem is dependent on the first optimization problem. For example, the workflow engine 110 may also produce a second branch object for the second optimization problem which stores a reference to the second optimization problem, a reference to the second solver engine, a reference to the second solver state stack, and dependency information that indicates the second optimization problem is dependent on the second optimization problem.

The workflow engine 110 then begins processing (at step 530) the work problem 111 based on the produced branch objects to generate one or more solutions for the work problem 111. To do so, for each branch object 150 produced for an optimization problem 120, the workflow engine 110 initiates processing of the optimization problem 120 based on the branch object 150. In particular, for each branch object 150, the workflow engine 110 initiates the specified solver engine 115 to process the specified optimization problem 120 in accordance with the specified solver state stack information and the specified dependency information. For example, based on the first branch object, the workflow engine 110 may initiate the first solver engine to process the first optimization problem to produce one or more solutions for the first optimization problem. The workflow engine 110 may also periodically generate one or more solver state objects for the first solver engine during processing of the first optimization problem, each solver state object being stored to the first solver state stack. For example, based on the second branch object, the workflow engine 110 may initiate the second solver engine to process the second optimization problem to produce one or more solutions for the second optimization problem. The workflow engine 110 may also periodically generate one or more solver state objects for the second solver engine during processing of the second optimization problem, each solver state object being stored to the second solver state stack.

Further, at step 530, based on the dependency information in the first branch object and/or the second branch object, the workflow engine 110 causes at least one solution generated for the first optimization problem by the first solver engine to be utilized as an initial solution for the second solver engine when processing the second optimization problem. The at least one solution generated for the first optimization problem to be utilized as an initial solution for the second solver engine may comprise an intermediate or final solution for the first optimization problem selected, for example, by a user through a user interface or selected by the workflow engine 110. In other embodiments, based on the dependency information in the first branch object and/or the second branch object, the workflow engine 110 causes at least one solver state object for the first solver engine to be utilized as an initial solver state object for the second solver engine when processing the second optimization problem. The at least one solver state object for the first optimization problem to be utilized as an initial solver state object for the second solver engine may comprise an intermediate or final solver state object for the first optimization problem selected, for example, by a user through a user interface or selected by the workflow engine 110. The second solver engine utilizes the initial solution or initial solver state as a starting point to produce one or more solutions for the second optimization problem which comprise one or more solutions for the overall work problem 111.

The workflow engine 110 then generates and displays (at step 540) a graphical representation of a current state of processing of the work problem 111 by the workflow engine 110 in a user interface 400. A flow diagram of method steps for operating the user interface 400 is discussed below in relation to FIG. 6.

The workflow engine 110 then determines (at step 550) if a pause command is received (for example, received from an operating system or system administrator). If not, the method continues at step 580. If a pause command is determined to be received, the method continues at step 560. For example, a pause command may be received when there are insufficient computing resources to process the work problem 111 or the task for processing the work problem 111 is being transferred to another computing device for completion. In response to receiving the pause command, at step 560, the workflow engine 110 terminates/stops processing of the optimization problems 120 of the work problem 111 by the corresponding solver engines 115, generates a solver state object for each solver engine 115 capturing the current state of the solver engine 115, and storing the solver state object to the corresponding solver state stack 125. At step 570, the workflow engine 110 then receives a resume command, and in response, retrieves the branch objects 150 associated with the work problem 111 and the most recent solver state objects for each solver engine 115. For example, the branch objects 150 may be retrieved locally or from the database 175 via the network 195. In some embodiments, if the task for processing the work problem 111 is being transferred to another computing device, the resume command is received at a workflow engine 110 executing on the another computing device, which in response, retrieves the branch objects 150 associated with the work problem 111 from the database 175 via the network 195. The method 500 then continues at step 530 whereby the workflow engine 110 resumes processing the work problem 111 based on the branch objects. The workflow engine 110 will resume processing the work problem 111 by retrieving (via the reference to the corresponding solver state stack in the branch object) the most recent solver state object generated for each solver engine 115 (when the pause command was received) and utilize the most recent solver state object as a resume point for each solver engine 115. For example, the workflow engine 110 may retrieve (via a reference to the first solver state stack stored in the first branch object) the solver state object generated for the first solver engine when the pause command was received and resume processing of the first optimization problem by the first solver engine based on the first solver state object. For example, the workflow engine 110 may retrieve (via a reference to the second solver state stack stored in the second branch object) the solver state object generated for the second solver engine when the pause command was received and resume processing of the second optimization problem by the second solver engine based on the second solver state object.

At step 580, the workflow engine 110 determines if a termination condition is triggered for processing the work problem 111. For example, a termination condition may be triggered by reaching a maximum number of iterations for processing the work problem 111 or a maximum amount of time allotted for processing the work problem 111. If not, the method 500 continues at step 530. If so, the workflow engine 110 generates a final solver state object for each solver engine 115 processing an optimization problem 120 of the work problem 111 and stores the final solver state object to the corresponding solver state stack 125. The method 500 then ends.

Figure 6:
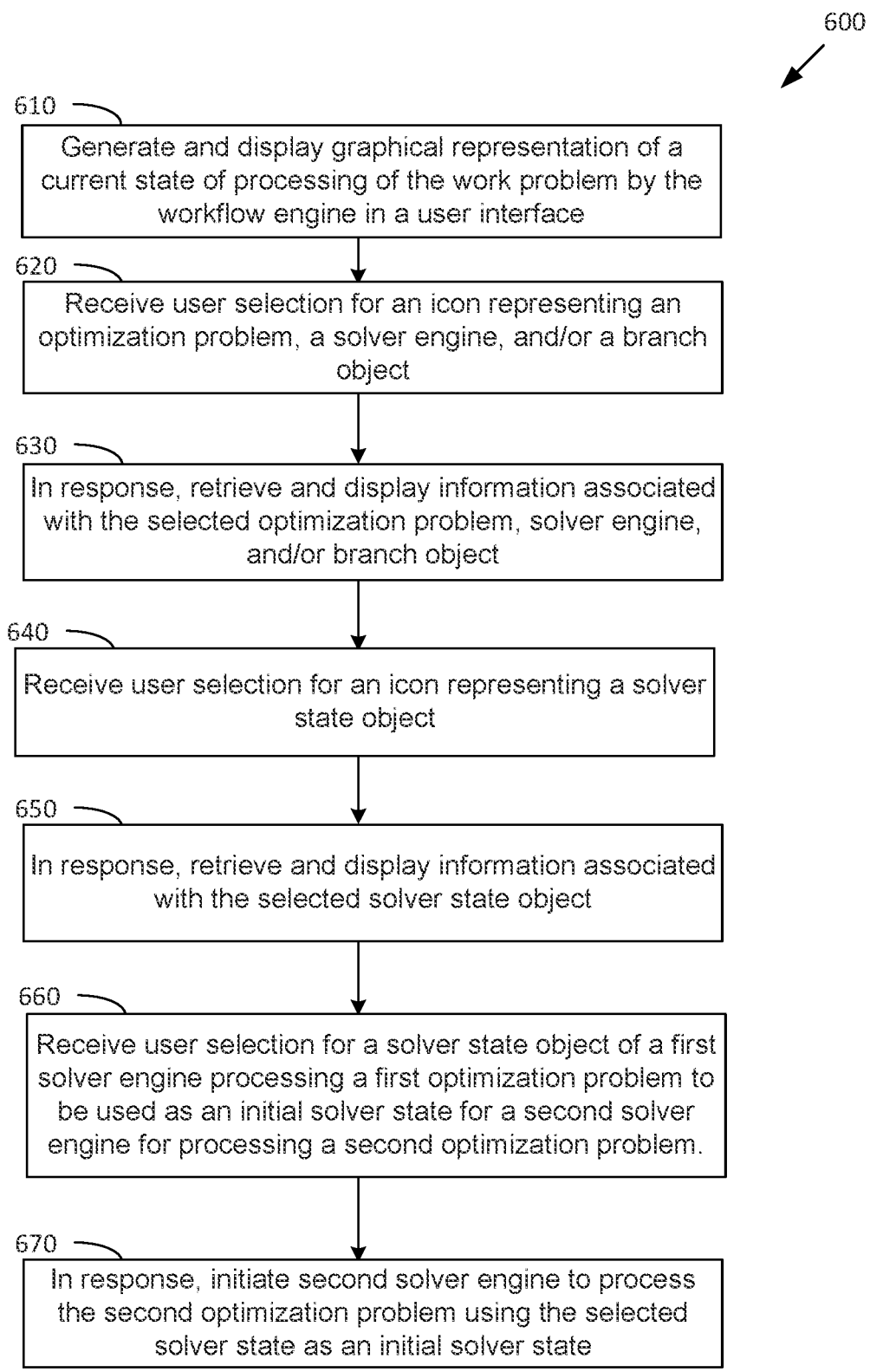
FIG. 6 illustrates a flow diagram of method steps for generating solutions to dependent optimization problems based on user inputs, according to various embodiments of the present invention.

FIG. 6 illustrates a flow diagram of method steps for generating solutions to dependent optimization problems based on user inputs, according to various embodiments of the present invention. Although the method steps are described in conjunction with the systems of FIGS. 1-4, persons skilled in the art will understand that the method steps can be performed in any order by any system. In some embodiments, the method 600 may be performed by a workflow engine 110 in conjunction with a plurality of solver engines 115.

The method 600 begins when the workflow engine 110 generates and displays (at step 610) a graphical representation of a current state of processing of the work problem 111 by the workflow engine 110 in a user interface 400. The user interface 400 displays, for each optimization problem 120 in the work problem 111, a selectable icon representing the optimization problem 120, a selectable icon representing each solver engine 115 assigned for processing the optimization problem 120, and a branch object 150 generated for the optimization problem 120. For each solver engine 115, the user interface 400 further displays selectable icons representing various solver state objects generated and stored for the solver engine 115 during processing of the corresponding optimization problem 120.

Via the user interface 400, the workflow engine 110 receives (at step 620) a user selection for an icon representing an optimization problem 120, a solver engine 115, and/or a branch object 150. In response, the workflow engine 110 retrieves and displays (at step 630) information associated with the selected optimization problem 120, solver engine 115, and/or branch object 150. Via the user interface 400, the workflow engine 110 receives (at step 640) a user selection for an icon representing a solver state object. In response, the workflow engine 110 retrieves and displays (at step 650) information associated with the selected solver state object.

Via the user interface 400, the workflow engine 110 receives (at step 660) a user selection for a solver state object of a first solver engine processing a first optimization problem to be used as an initial solver state for a second solver engine for processing a second optimization problem. In response, the workflow engine 110 initiates (at step 670) the second solver engine to process the second optimization problem using the selected solver state as an initial solver state. In particular, the workflow engine 110 may initiate the second solver engine to process the second optimization problem using at least one solution of the selected solver state as an initial solution. The method 600 then ends.

In some embodiments, the objective function generated for an optimization problem 120 may comprise a composite objective function comprising two or more objective functions. For example, the composite objective function for an optimization problem 120 may include a first objective function comprising a first set of objectives and a second objective function comprising a second set of objectives specified for the optimization problem 120. A solver engine 115 assigned to process an optimization problem 120 may invoke the composite objective function to generate one or more solutions for the optimization problem 120. In this regard, the assigned solver engine 115 processes each of the objective functions contained in the composite objective function. In these embodiments, by breaking down a composite objective function into multiple parts, each separate objective function can be more easily processed by the solver engine 115 and/or reused in another optimization problem 120 without any change, either by itself or as part of another composite objective function.

In sum, a workflow engine 110 processes a work problem 111 to generate one or more solutions for the work problem 111. The work problem 111 comprises a plurality of related optimization problems 120. For example, the work problem 111 may comprise a second optimization problem that is dependent on a first optimization problem, such that at least one solution generated for the first optimization problem 120a is to be utilized as an initial solution for the second optimization problem 120b. The workflow engine 110 generates and stores a branch object for each optimization problem 120 in the work problem 111. Each branch object 150 specifies an optimization problem 120, a solver engine 115 assigned for processing the optimization problem 120, a solver state stack 125 for the solver engine 115, and dependency information indicating a dependency relationship between the optimization problem 120 and another optimization problem 120 in the work problem 111. The workflow engine 110 then processes the work problem 111 based on the generated branch objects 150. The workflow engine 110 may do so by initiating each solver engine 115 to perform optimization operations on the assigned optimization problem 120 based on the corresponding branch object 150 to generate one or more solutions for the assigned optimization problem 120.

For example, the workflow engine 110, based on a first branch object, the workflow engine 110 may initiate a first solver engine to process a first optimization problem 120a to generate one or more solutions for the first optimization problem. Based on a second branch object, the workflow engine 110 may also initiate second solver engine to process a second optimization problem to generate one or more solutions for the second optimization problem using one or more solutions generated for the first optimization problem 120a by the first solver engine 115a. The one or more solutions generated for the second optimization problem 120b by second solver engine 115b comprises intermediate or final solutions for the work problem 111.

At least one technological improvement of the disclosed techniques relative to prior art is that multiple branch objects are produced to specify configuration and assignment of multiple solver engines to multiple optimization problems and dependencies between the multiple optimization problems. Optimization operations are then executed on the optimization problems based on the branch objects for generating one or more solutions for the optimization problems. As the branch objects capture the configuration and assignments of the solver engines to the dependent optimization problems and the dependencies between the optimization problems, the branch objects can be implemented to execute the optimization operations on the dependent optimization problems, without requiring manual operations from a designer. In this manner, the burden, inefficiencies, and chance of errors incurred in the manual configuration and assignment of multiple solvers for dependent optimization problems incurred in the prior art is avoided.

At least one other technological improvement of the disclosed techniques relative to prior art is that the branch objects may be repeatedly retrieved and implemented whenever pause/resume processes are required to continue execution of the optimization operations on the dependent optimization problems. Thus, the disclosed technique enables the optimization operations to be more easily and efficiently resumed after a pause operation relative to the prior art, which required manual re-configuration and re-assignment of the multiple solvers to the dependent optimization problems and re-configuration of any dependencies upon resuming the optimization operations.

At least one other technological improvement of the disclosed techniques relative to prior art is that the branch objects may be retrieved and implemented at another computer system if the execution of the optimization operations on the dependent optimization problems is transferred to another computer system. Thus, the disclosed technique enables the optimization operations to be more easily and efficiently resumed at another computer system relative to the prior art, which required communications with a second designer at the other computer system followed by manual re-configuration and re-assignment of the multiple solvers to the dependent optimization problems and re-configuration of any dependencies by the second designer upon resuming the optimization operations at the other computer system.

Aspects of the subject matter described herein are set out in the following numbered any of clauses.

1. In some embodiments, a computer-implemented method comprising: generating a first branch object that specifies a first optimization problem and a first solver engine associated with the first optimization problem; generating a second branch object that specifies a second optimization problem, a second solver engine associated with the second optimization problem, and a dependency between the second optimization problem and the first optimization problem; processing the first optimization problem based on the first branch object to generate one or more solutions for the first optimization problem; and processing the second optimization problem based on the second branch object to generate one or more solutions for the second optimization problem.

2. The computer-implemented method of clause 1, wherein processing the first optimization problem based on the first branch object comprises initiating the first solver engine to perform one or more optimization operations on the first optimization problem.

3. The computer-implemented method of any of clauses 1-2, wherein processing the second optimization problem based on the second branch object comprises initiating the second solver engine to process the second optimization problem based on at least one solution generated for the first optimization problem by the first solver engine.

4. The computer-implemented method of any of clauses 1-3, wherein the at least one solution generated for the first optimization problem comprises an initial solution received by the second solver engine for processing the second optimization problem.

5. The computer-implemented method of any of clauses 1-4, wherein: processing the first optimization problem based on the first branch object generates a plurality of solutions for the first optimization problem; and the at least one solution generated for the first optimization problem comprises a solution selected from the plurality of solutions for the first optimization problem by a user via a user interface.

6. The computer-implemented method of any of clauses 1-5, wherein: processing the first optimization problem based on the first branch object generates a plurality of solutions for the first optimization problem; and the at least one solution generated for the first optimization problem comprises an intermediate or final solution generated for the first optimization problem by the first solver engine.

7. The computer-implemented method of any of clauses 1-6, further comprising generating a first solver state object for the first solver engine, the first solver state object comprising state information describing a first state of the first solver engine when processing the first optimization problem.

8. The computer-implemented method of any of clauses 1-7, further comprising: storing the first solver state object to a first solver state stack associated with the first solver engine; and storing a reference to the first solver state stack in the first branch object.

9. The computer-implemented method of any of clauses 1-8, further comprising: generating a graphical representation of processing of the first optimization problem based on the first branch object and processing the second optimization problem based on the second branch object; and displaying the graphical representation in a user interface.

10. The computer-implemented method of any of clauses 1-9, further comprising: receiving a selection of the first branch object via the user interface; and displaying information for the first branch object in the user interface.

11. In some embodiments, a non-transitory computer-readable medium storing program instructions that, when executed by a processor, cause the processor to perform the steps of: generating a first branch object that specifies a first optimization problem and a first solver engine associated with the first optimization problem; generating a second branch object that specifies a second optimization problem, a second solver engine associated with the second optimization problem, and a dependency between the second optimization problem and the first optimization problem; processing the first optimization problem based on the first branch object to generate one or more solutions for the first optimization problem; and processing the second optimization problem based on the second branch object to generate one or more solutions for the second optimization problem.

12. The non-transitory computer-readable medium of clause 11, wherein processing the first optimization problem based on the first branch object comprises initiating the first solver engine to perform one or more optimization operations on the first optimization problem.

13. The non-transitory computer-readable medium of any of clauses 11-12, wherein processing the second optimization problem based on the second branch object comprises initiating the second solver engine to process the second optimization problem based on at least one solution generated for the first optimization problem by the first solver engine.

14. The non-transitory computer-readable medium of any of clauses 11-13, wherein the at least one solution generated for the first optimization problem comprises an initial solution received by the second solver engine for processing the second optimization problem.

15. The non-transitory computer-readable medium of any of clauses 11-14, further comprising generating a first solver state object for the first solver engine, the first solver state object comprising state information describing a first state of the first solver engine when processing the first optimization problem.

16. The non-transitory computer-readable medium of any of clauses 11-15, further comprising: storing the first solver state object to a first solver state stack associated with the first solver engine; and storing a reference to the first solver state stack in the first branch object.

17. The non-transitory computer-readable medium of any of clauses 11-16, wherein: the first solver state stack comprises a plurality of solver state objects generated for the first solver engine; each solver state object comprises one or more references to one or more solutions generated for the first optimization problem.

18. The non-transitory computer-readable medium of any of clauses 11-17, wherein the first optimization problem is processed by the first solver engine, the method further comprising: receiving a pause command; terminating processing of the first optimization problem by the first solver engine; and generating and storing a first solver state object for the first solver engine.

19. The non-transitory computer-readable medium of any of clauses 11-18, further comprising: receiving a resume command; retrieving the first solver state object for the first solver engine; and resuming processing of the first optimization problem by the first solver engine based on the first solver state object.

20. In some embodiments, a computing system comprising: a memory that includes instructions; and a processor that is coupled to the memory and, upon executing the instructions, is configured to perform the steps of: generating a first branch object that specifies a first optimization problem and a first solver engine associated with the first optimization problem; generating a second branch object that specifies a second optimization problem, a second solver engine associated with the second optimization problem, and a dependency between the second optimization problem and the first optimization problem; processing the first optimization problem based on the first branch object to generate one or more solutions for the first optimization problem; and processing the second optimization problem based on the second branch object to generate one or more solutions for the second optimization problem.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a plurality of design solutions, the method comprising:
   generating a first branch object that specifies a first optimization problem and a first solver engine;
   generating a second branch object that specifies a second optimization problem, a second solver engine, and a dependency between the second optimization problem and the first optimization problem;
   executing the first solver engine to generate one or more solutions for the first optimization problem; and
   executing the second solver engine to generate one or more solutions for the second optimization problem.

2. The computer-implemented method of claim 1, wherein the first solver engine, during execution, performs one or more optimization operations on the first optimization problem.

3. The computer-implemented method of claim 1, wherein the second solver engine, during execution, processes the second optimization problem based on at least one solution generated for the first optimization problem by the first solver engine.

4. The computer-implemented method of claim 3, wherein the at least one solution generated for the first optimization problem comprises an initial solution for the second optimization problem.

5. The computer-implemented method of claim 3, wherein:
   during execution, the first solver engine generates a plurality of solutions for the first optimization problem; and
   the at least one solution generated for the first optimization problem comprises a solution selected from the plurality of solutions for the first optimization problem via a user interface.

6. The computer-implemented method of claim 3, wherein:
   during execution, the first solver engine generates a plurality of solutions for the first optimization problem; and
   the at least one solution generated for the first optimization problem comprises an intermediate or final solution for the first optimization problem.

7. The computer-implemented method of claim 1, further comprising generating a first solver state object for the first solver engine, wherein the first solver state object comprises state information describing a first state of the first solver engine during execution.

8. The computer-implemented method of claim 7, further comprising:
   storing the first solver state object to a first solver state stack associated with the first solver engine; and
   storing a reference to the first solver state stack in the first branch object.

9. The computer-implemented method of claim 1, further comprising:
   generating a graphical representation of the first solver engine generating the one or more solutions for the first optimization problem and of the second solver engine generating the one or more solutions to the second optimization problem; and
   displaying the graphical representation in a user interface.

10. The computer-implemented method of claim 9, further comprising:
    receiving a selection of the first branch object via the user interface; and
    displaying information for the first branch object in the user interface.

11. The computer-implemented method of claim 1, wherein the first solver engine and the second solver engine comprise different types of solver engines.

12. The computer-implemented method of claim 1, wherein the first solver engine comprises a discrete optimizer, and the second solver engine comprises a continuous optimizer.

13. The computer-implemented method of claim 1, wherein the first optimization problem and the second optimization problem comprise different types of optimization problems.

14. The computer-implemented method of claim 1, wherein the first optimization problem comprises a discrete optimization problem, and the second optimization problem comprises a continuous optimization problem.

15. One or more non-transitory computer-readable media storing program instructions that, when executed by one or more processors, cause the one or more processors to perform the steps of:
    generating a first branch object that specifies a first optimization problem and a first solver engine;
    generating a second branch object associated with a second optimization problem, a second solver engine, and a dependency between the second optimization problem and the first optimization problem;
    executing the first solver engine to generate one or more solutions for the first optimization problem; and
    executing the second solver engine to generate one or more solutions for the second optimization problem.

16. The one or more non-transitory computer-readable media of claim 15, wherein the first solver engine, during execution, performs one or more optimization operations on the first optimization problem.

17. The one or more non-transitory computer-readable media of claim 15, wherein the second solver engine, during execution, processes the second optimization problem based on at least one solution generated for the first optimization problem by the first solver engine.

18. The one or more non-transitory computer-readable media of claim 17, wherein the at least one solution generated for the first optimization problem comprises an initial solution for the second optimization problem.

19. The one or more non-transitory computer-readable media of claim 15, further comprising generating a first solver state object for the first solver engine, wherein the first solver state object comprises state information describing a first state of the first solver engine during execution.

20. The one or more non-transitory computer-readable media of claim 19, further comprising:
   storing the first solver state object to a first solver state stack associated with the first solver engine; and
   storing a reference to the first solver state stack in the first branch object.

21. The one or more non-transitory computer-readable media of claim 20, wherein:
   the first solver state stack comprises a plurality of solver state objects generated for the first solver engine; and
   each solver state object comprises one or more references to one or more solutions generated for the first optimization problem.

22. The one or more non-transitory computer-readable media of claim 15, further comprising:
   receiving a pause command;
   terminating execution of the first solver engine; and
   generating and storing a first solver state object for the first solver engine.

23. The one or more non-transitory computer-readable media of claim 22, further comprising:
   receiving a resume command;
   retrieving the first solver state object for the first solver engine from a memory; and
   resuming execution of the first solver engine based on the first solver state object.

24. A computing system comprising:
   one or more memories storing instructions; and
   one or more processors that are coupled to the one or more memories and, when executing the instructions, are configured to perform the steps of:
      generating a first branch object that specifies a first optimization problem, a first solver engine, and a dependency between the first optimization problem and a second optimization problem of a second branch object;
      executing a second solver engine to generate one or more solutions for the first optimization problem; and
      executing the first solver engine to generate one or more solutions for the second optimization problem.

* * * * *